United States Patent [19]

Korstvedt

[11] 4,066,246
[45] Jan. 3, 1978

[54] SANITARY PIPELINE MIXER

[75] Inventor: Harald Olaf Korstvedt, Brookline, Mass.

[73] Assignee: J. W. Greer, Inc., Hudson, N.H.

[21] Appl. No.: 641,973

[22] Filed: Dec. 18, 1975

[51] Int. Cl.² ............................................. B01F 7/02
[52] U.S. Cl. .................................. 366/293; 285/40; 366/176; 366/305
[58] Field of Search ............... 259/9, 10, 25, 26, 45, 259/46, 68, 69, DIG. 16, DIG. 30; 277/62; 285/367, 411, 410; 269/43

[56] References Cited

U.S. PATENT DOCUMENTS

| | | | |
|---|---|---|---|
| 530,679 | 12/1894 | Brien | 285/411 |
| 2,240,841 | 5/1941 | Flynn | 259/DIG. 30 |
| 2,675,253 | 4/1954 | Stade | 285/410 X |
| 2,851,256 | 9/1958 | Andreopoulos et al. | 259/9 |
| 2,853,020 | 9/1958 | Hollinger et al. | 277/62 X |
| 2,862,731 | 12/1958 | Hedden et al. | 285/367 X |
| 3,000,618 | 9/1961 | Oakes | 259/9 |
| 3,132,847 | 5/1964 | Mercuriali | 259/9 |
| 3,184,221 | 5/1965 | Mould | 259/9 X |
| 3,484,113 | 12/1969 | Moore | 277/62 |
| 3,661,398 | 5/1972 | Hummer | 277/87 X |

FOREIGN PATENT DOCUMENTS 703,636  2/1965  Canada ................. 259/DIG. 16

Primary Examiner—Charles E. Phillips
Attorney, Agent, or Firm—Morse, Altman, Oates & Bello

[57] ABSTRACT

A sanitary pipeline mixer with a rotor and a stator disposed along a common axis within a turbine housing having an internal mixing chamber that communicates with an inlet port and a discharge duct. An inlet duct is removably connected to the turbine housing at the inlet port by means of a swing clamp for quick disassembly. The rotor is threaded to a shaft which extends through the mixing chamber, through a seal housing and is journaled in a bearing housing, the shaft being coupled to a motor shaft. A double flushed mechanical seal is provided about the rotor shaft at the interface of the turbine and seal housings. The turbine housing is removably mounted to the seal housing by means of a swing clamp for quick disassembly, the mechanical seal being exposed when the housings are disassembled.

4 Claims, 10 Drawing Figures

SANITARY PIPELINE MIXER

BACKGROUND OF THE INVENTION

1. Field of the Invention

The present invention relates to mixers and, more particularly, is directed towards pipeline mixers.

2. Description of the Prior Art

Pipeline mixers of various types have been used in the chemical industry for dispersing, delumping, emulsifying, homogenizing and deagglomerating liquids, pastes and slurries. One type pipeline mixer includes a rotor and stator disposed along a common axis within a turbine housing having an inlet port and a discharge duct. The rotor is threaded to a shaft which extends through a bearing housing and is connected to a motor shaft. The turbine housing is fitted with a double mechanical seal that forms a mixing chamber within the turbine housing. The bearing housing and turbine housing are provided with mating flanges that are bolted together. The turbine housing is formed with a flange about the inlet port which mates with an inlet duct flange, the two flanges being bolted together. Pipeline mixers have suffered from the disadvantage that contaminants are accumulated at the interfaces and joints of the mixer and within the mechanical seal. Such an accumulation is particularly detrimental if the pipeline mixer is used in the food industry. In order the maintain sanitary conditions, the pipeline mixer is disassembled for cleaning and then is reassembled. Due to the pipeline mixer mechanical configuration, disassembly, cleaning and reassembly is a time consuming task. In consequence, the use of pipeline mixers in the food industry has been met with limited success. A need has arisen for a pipeline mixer that is characterized by minimum accumulation of contaminants and that is readily disassembled, cleaned and reassembled.

SUMMARY OF THE INVENTION

It is an object of the present invention to provide a sanitary pipeline mixer for dispersing, delumping, emulsifying, homoginizing and deagglomerating liquids, pastes and slurries. The pipeline mixer is configured for minimum contaminant accumulation and for rapid disassembly for cleaning. The sanitary pipeline mixer includes a bladed rotor and apertured stator that are mounted along a common axis within a turbine housing having an internal mixing chamber which communicates with an inlet port and a discharge duct. An inlet duct is connected to the inlet port by means of a swing clamp that facilitates disassembly and reassembly. The rotor is threaded to a shaft which extends through the mixing chamber, through a seal chamber, and is journaled in a bearing housing. The free end of the rotor shaft is coupled to a motor shaft. A double flushed mechanical seal envelops the rotor shaft at the interface of the turbine housing and seal housing. The turbine housing is mounted to the seal housing by means of a swing clamp for quick disassembly, the seal being exposed for cleaning when the housings are disassembled.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
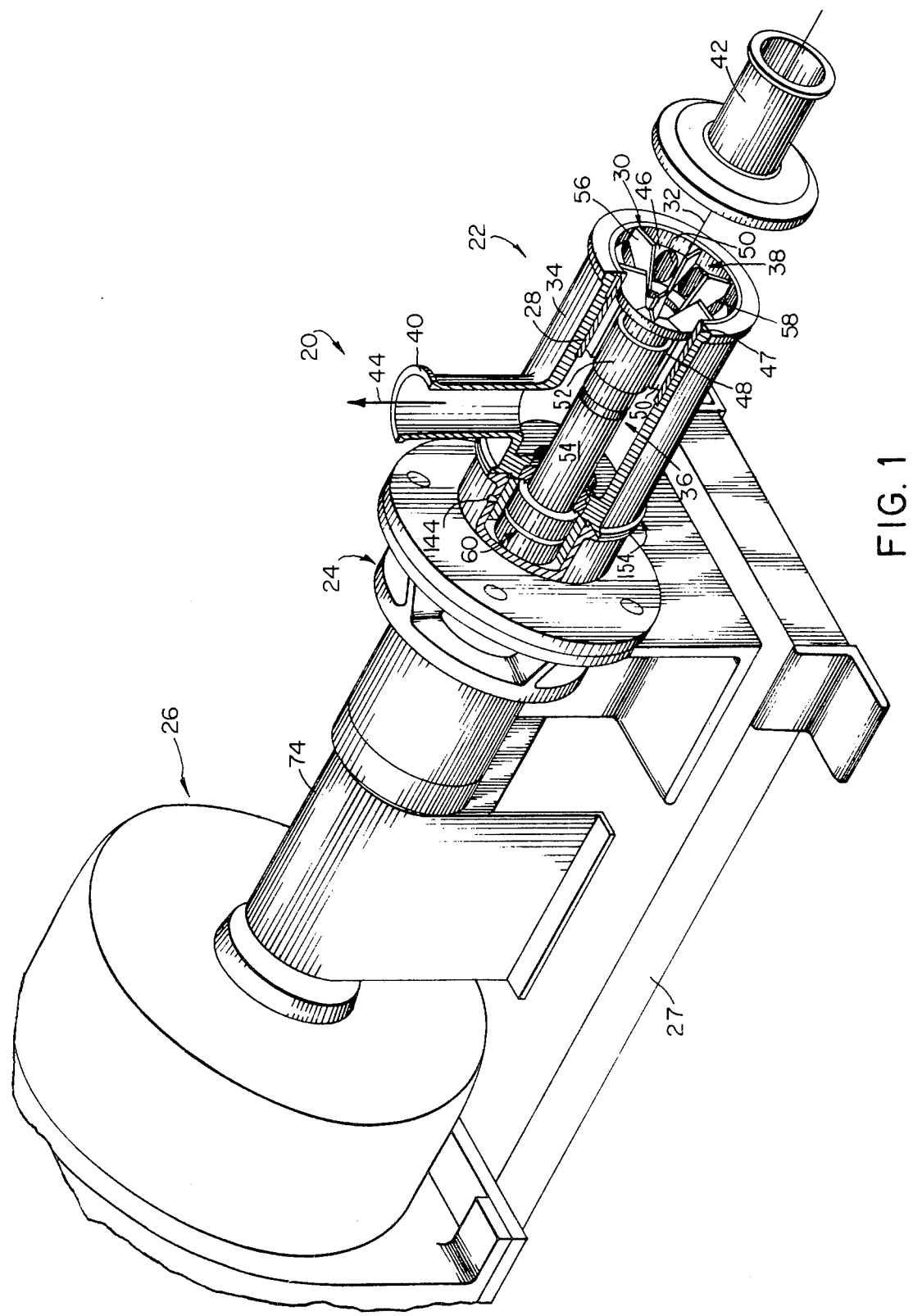
FIG. 1 is a perspective view, partly broken away, of a sanitary pipeline mixer embodying the invention.

Referring now to the drawings, particularly FIG. 1, there is shown a sanitary pipeline mixer 20 comprising a mixing head 22, a bearing assembly 24 and a motor assembly 26, which are mounted to a base 27. Mixing head 22 includes a stator 28 and a rotor 30 that are disposed along a common axis 32 within a turbine housing 34 having an internal mixing chamber 36 that communicates with an inlet port 38 and a discharge duct 40. An inlet duct 42 is mounted to turbine housing 34 at inlet port 38. Discharge duct 40 is disposed about an axis 44 which is in perpendicular relationship to common axis 32 about which inlet port 36 and inlet duct 40 are coaxially disposed. Stator 28, rotor 30, turbine housing 34 and discharge duct 40 are composed of a metal, preferably stainless steel.

Stator 28, which is positioned at a forward region of mixing head 22 between mixing chamber 36 and inlet port 38, includes a cylindrical body 47 that has an internal reentrant conical surface 46 which converges inwardly toward mixing chamber 36 and terminates in a central cylindrical opening 48. Stator 28 is provided with a series of arcuately disposed passages 50 that extend from a forward end of conical surface 46 to a rearward face of body 47 in spaced parallel relationship to common axis 32. An abrasion resistant bushing 52, composed of polyethylene, preferably an ultra high molecular weight polyethylene, is rotatably fitted within cylindrical opening 48 and carries a shaft 54.

Rotor 30, which is threaded to one end of shaft 54 and is rotatable within the region defined by conical surface 46, is provided with a series of six vanes 56, the outer edges 58 of which are in close adjacency with the conical surface. Edges 58 are disposed along a theoretical conical surface that is closely spaced to conical surface 46 of stator 28. Rotor 30 is rotated by shaft 54, the other end of which is coupled to motor assembly 26.

Figure 2:
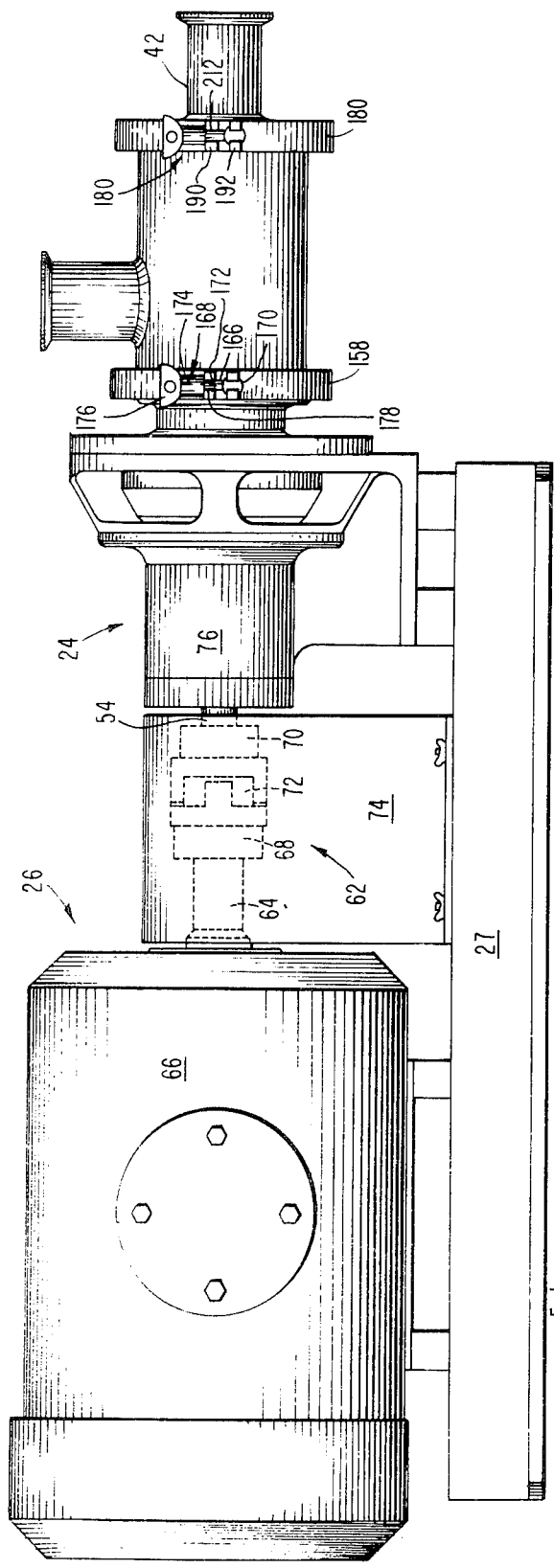
FIG. 2 is a side elevation of the pipeline mixer of FIG. 1.

Shaft 54 extends rearwardly through bushing 52, mixing chamber 36, a seal assembly 60 and bearing assembly 24. As best shown in FIG. 2, a coupler 62 connects the free end of shaft 54 to a shaft 64 of a motor 66. Coupler 62 includes a coupling half 68 having a central bore which receives motor shaft 64 and a coupling half 70 having a central bore which receives rotor shaft 54, the coupling halves being interconnected by a coupling insert 72. Coupling halves 68 and 70 are composed of a metal, preferably aluminum, and coupling insert 72 is composed of an elastomer, preferably rubber. A guard 74, composed of a metal, preferably stainless steel, is mounted to base 27, which is composed of a metal, preferably steel.

Figure 5:
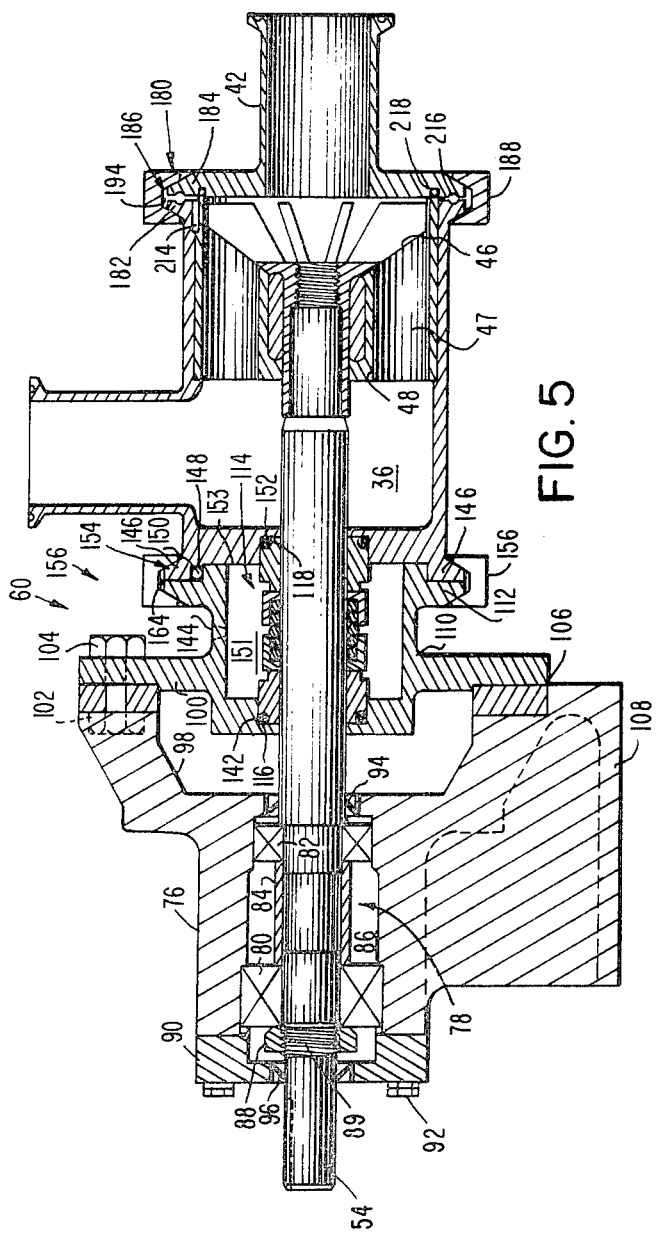
FIG. 5 is a sectional view taken along the lines 5—5 of FIG. 3.

Forwardly of coupler 62, shaft 54 passes through bearing assembly 24 which includes a bearing housing 76. As shown in FIG. 5, shaft 54 is journaled in a bearing unit 78 which includes a pair of ball bearings 80, 82 that are separated by a bearing spacer 84. Bearing housing 76 is composed of a metal, preferably cast iron. A bearing cavity 86, which is disposed between the inner surface of bearing housing 76 and spacer 84, is packed with grease, preferably one-third full. Bearing unit 78 is captively held within bearing housing 76 by a locknut 88 turned on a threaded portion 89 of shaft 54. Sanitary threads are provided on the shaft end turbine to ensure sanitation and to facilitate rapid disassembly. Preferably, the sanitary threads are Acme threads and specifically 10° modified square threads in which the basic width of the flat is 0.4563 times the pitch. A thrust cap 90, which is composed of a metal, preferably aluminum, is fastened to the rearward end of bearing housing 76 by bolts 92 that are threaded into the bearing housing. A pair of seals 94 and 96 hermetically isolate bearing housing 76 from the atmosphere. Seals 94 and 96 are composed of an elastomer, preferably a nitrile rubber, commonly referred to as Buna-N rubber, made by reacting butadiene with a nitrile. The forward end of bearing housing 76 is provided with a flange 98 that mates with a flange 100 on the rearward end of seal assembly 60. Flanges 98 and 100 are fastened together by means of bolts 102 and nuts 104, shims 106 being disposed between the flange faces for proper alignment. Bearing assembly 76 is provided with a leg 108 that is mounted to base 27.

Figure 6:
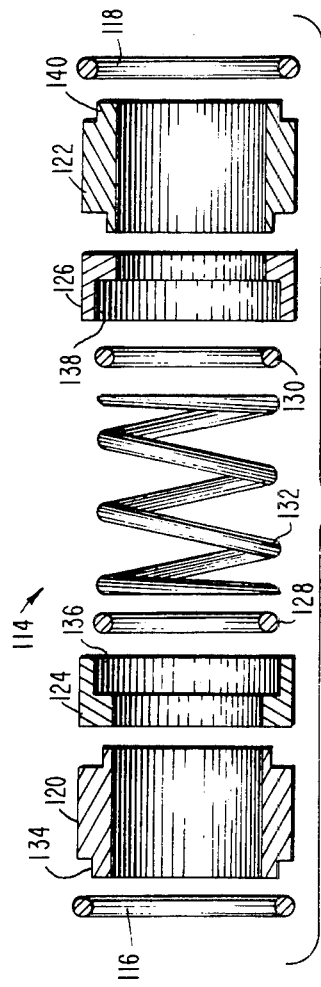
FIG. 6 is an exploded sectional view of the doubled flush mechanical seal of FIG. 5.

Seal assembly 60 includes a seal housing 110 having flange 100 at a rearward section and a flange 112 at a forward section. A double flushed mechanical seal 114 is seated within seal housing 110. As shown in FIG. 6, seal 114 includes a pair of external O-rings 116 and 118, a pair of stationary end plates 120 and 122, a pair of rotating seal rings 124 and 126, a pair of internal O-rings 128 and 130, and a bias element 132. End plate 120 is interchangeable with end plate 122 and a seal ring 124 is interchangeable with seal ring 126. Each end plate is composed of a nonmetal, preferably carbon and each seal ring is composed of a metal, preferably tungsten carbide. O-rings 116, 118, 128 and 130 are composed of an elastomer, preferably Buna-N rubber. Bias element 132, for example a spring, is composed of a metal, preferably stainless steel. End plate 120, on its outer face, is provided with a shoulder 134 in which O-ring 116 is seated. The inner face of end plate 120 abuts against one end of seal ring 124. The opposite end of seal ring 124 is provided with a seat 136 which is configured to receive O-ring 128 and one end of spring 132. The other end of spring 132 and O-ring 130 are received in a seat 138 provided at one end of seal ring 126. The other end of seal ring 126 abuts against an inner face of end plate 122. The outer end of end plate 122 is provided with a shoulder 140 in which O-ring 118 is seated. Seal 114 is seated within seal housing 110 in such a manner that O-ring 116 abuts a shoulder 142 at the rearward portion of the seal housing. O-rings 128 and 130 create a chamber behind O-rings 116 and 118 for introduction of a flush fluid, such as water or a non-lubricating fluid, through a bore 144 in seal housing 110. Seal housing 110 is composed of a metal, preferably stainless steel.

Figure 4:
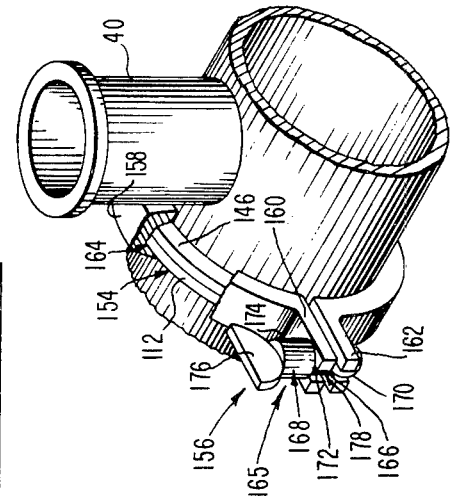
FIG. 4 is a perspective of the clamping arrangement for connecting the seal assembly and mixer assembly.

When pipeline mixer 20 is assembled, seal 114 is received within an internal cavity 151 of seal housing 110, a portion of end plate 122 and O-ring 118 extending out of a forward portion of the cavity. Flange 112 of seal housing 110 abuts against a flange 146 of turbine housing 34, an O-ring 148 being seated in a shoulder 150 of flange 146. O-ring 118 abuts against a shoulder 152 of a seat 153 provided in flange 146 of turbine housing 34, Spring 132 is operative to urge seal rings 124 and 126 against end plates 120 and 122, respectively, for providing a positively biased seal. The outer faces of flanges 112 and 146 define a frusto-conical male head 154. Turbine housing 34 is fastened to seal housing 110 by a clamp 156 which includes an annular body 158 that terminates in a pair of outwardly extending feet 160 and 162, as shown in FIG. 4. Clamp 156 is provided with a frusto-conical female socket 164, that is configured to matingly engage male head 154 for clamping flanges 112 and 146. Feet 160 and 162 are clamped together by means of a fastener 165 which includes a bolt 166 and a nut 168. Bolt 166 includes an enlarged spherical head 170 and an externally threaded body 172. Nut 168 includes an internally threaded socket 174 and a handle 176. Head 170 of bolt 166 is pivotally mounted within a socket provided in foot 162 in such a manner that threaded body 172 is constrained to be moved in and out of engagement with a slot 178 provided in foot 160. When nut 174 is turned onto threaded body 172, feet 160 and 162 are pulled together, thereby pressing female socket 164 into male head 154 and clamping together turbine housing 34 and seal housing 60. It is to be noted that the clamping arrangement is such that the discharge duct 40 can be freely rotated to any desired position when clamp 156 is loosened. That is, with clamp 156 loosened, duct 40 is free to rotate 360° about common axis 32. When clamp 156 is tightened, duct 40 is fixed against rotation. In order to separate mixing head 22 and seal asembly 60, nut 174 is loosened until threaded body 172 is free to swing out of engagement with slot 178. Then, clamp 156 is taken off. When turbine housing 34 is removed, double flushed mechanical seal 114 is exposed for cleaning.

Figure 3:
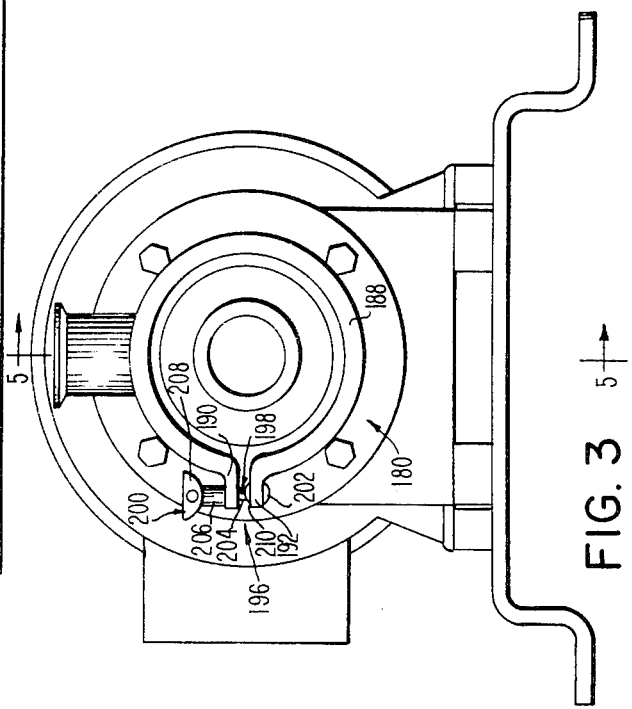
FIG. 3 is an end view of the pipeline mixer of FIG. 1.

As shown in FIGS. 3 and 5, inlet duct 42 is fastened to mixing head 22 by means of a clamp 180 which is structurally and functionally identical to clamp 156. Turbine housing 34 is provided with a flange 182 about inlet port 38 that mates with a flange 184 of inlet duct 42. Collectively, flanges 182 and 184 define a frusto-conical male head 186. Clamp 180 includes an annular body 188 that terminates in a pair of outwardly extending feet 190 and 192 as shown in FIG. 3. Clamp 180 is provided with a frusto-conical female socket 194 that is configured to matingly engage male head 186 for clamping flanges 182 and 184. Feet 190 and 192 are clamped together by means of a fastener 196 which includes a bolt 198 and a nut 200. Bolt 198 includes an enlarged spherical head 202 and an externally threaded body 204. Nut 200 includes an internally threaded socket 206 and a handle 208. Head 202 of bolt 198 is pivotally mounted within a socket 210 provided in foot 192 in such a manner that threaded body 204 is constrained to be swung in and out of engagement with a slot 212 (FIG. 2) provided in foot 190. When nut 200 is turned onto threaded body 204, feet 190 and 192 are pulled together, thereby pressing female socket 194 into male head 186 and clamping together turbine housing 34 and inlet duct 42. It is to be noted that stator 28 is captively held to turbine housing 34 by means of a pin 214 and a gasket 216 is positioned between the mating faces of flanges 182 and 184. In addition, an O-ring 218 is seated in a groove 20 provided in inlet duct 42. Gasket 216 and O-ring 218 are composed of an elastomer, preferably Buna-N rubber. In order to separate mixing head 22 and inlet duct 42, nut 200 is loosened until threaded body 204 is free to swing out of engagement with slot 212. Then clamp 180 is taken off. Clamps 156 and 180 are composed of a metal, preferably stainless steel.

Figure 7:
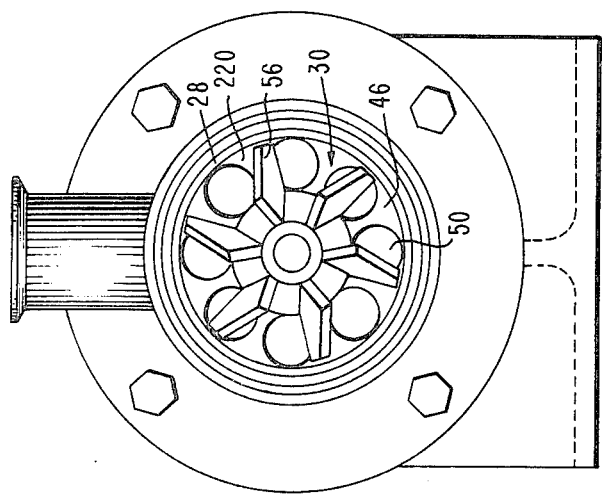
FIG. 7 is an end view of the mixing head of FIG. 1 with the inlet duct removed.

As shown in FIG. 7, rotor 30 has six vanes 56, each of which constitutes a forwardly extending skewed blade which is offset from the rotational axis of the rotor and is disposed in a plane that intersects the rotational axis of the rotor. Stator 28 is provided with conical surface 46 defining a conical socket and having a plurality of passages 50, each of which has an elliptical profile at the forward end of the stator and a circular profile at the rearward end of the stator. The lines of orientation of blades 56 and the lines of orientation of passages 50 are arranged so that as the blades spin, the lines are parallel, thereby creating rapid pressure changes within the passages. The centrifugal force created by the revolving turbine blades 56 inparts velocity to a fluid to be mixed, thereby pumping the fluid from inlet duct 42, through mixing chamber 36 and through discharge duct 40. Seal 114 is configured to withstand pressure of at least 75 pounds per square inch of mercury. It is to be noted that all product contact surfaces are stainless steel or other materials specifically suited for food contact, all welds are ground and polished.

Figure 9:
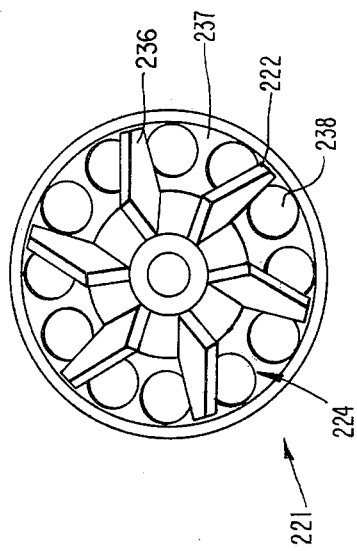
FIG. 9 is an end view of the primary stage of the mixing head of FIG. 8.
Figure 10:
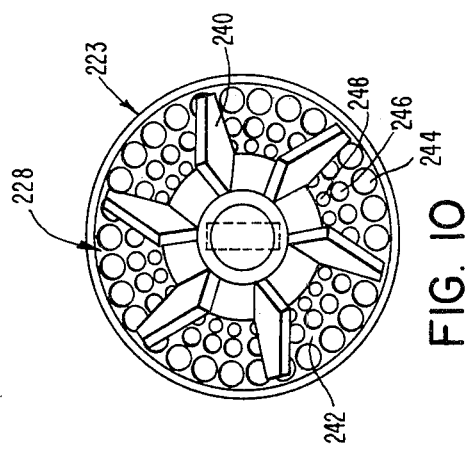
FIG. 10 is an end view of the secondary stage of the mixing head of FIG. 8.
Figure 8:
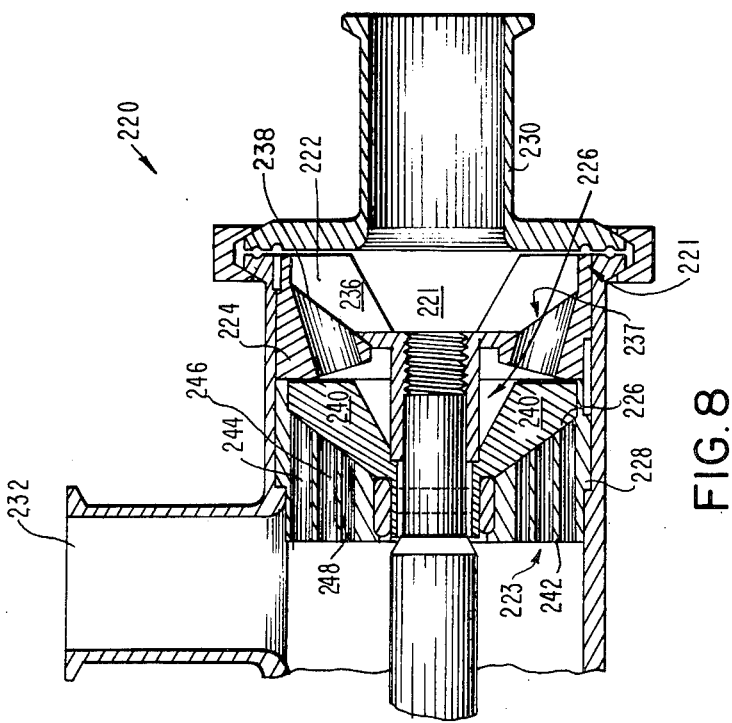
FIG. 8 is an alternative embodiment of the mixing head of FIG. 1 and shows a two stage mixing head.

Referring now to FIGS. 8, 9 and 10, there is shown an alternative embodiment of mixing head 22 in the form of a tandem mixing head 220 having a primary stage 221, a secondary stage 223, an inlet duct 230 and a discharge duct 232. Primary stage 221 includes a primary rotor 222 and a primary stator 224. Secondary stage 223 includes a secondary rotor 226 and a secondary stator 228. Rotor 222, which is composed of a metal, preferably stainless steel, has six vanes 236, each of which constitutes a forwardly extending skewed blade which is offset from the rotational axis of the rotor and is disposed in a plane that intersects the rotational axis of the rotor. Stator 224, which is composed of a metal, preferably stainless steel, is provided with a conical socket 237 having a plurality of arcuately disposed passages 238 that are parallel to the axis of rotation. Each passage 238 has an elliptical profile at the forward end of stator 224 and a circular profile at the rearward end of the stator. The lines of rotation of blades 236 and the lines of rotation of passages 238 are arranged so that as the blades spin, the lines are parallel, thereby creating rapid pressure changes within the passages. The centrifugal force created by the revolving blades 236 impart velocity to a fluid entering inlet duct 230, thereby pumping fluid from inlet duct 232 through primary stage 221 to secondary stage 223.

Rotor 226 has six vanes 240, each of which constitutes a forwardly extending skewed blade which is offset from the rotational axis of the rotor and is is disposed in a plane that intersects the rotational axis of the rotor. Stator 228 is provided with a conical socket 242 having rows of arcuately disposed passages 244, 246 and 248, each passage being parallel to the axis of rotation. Each passage 244, 246 and 248 has an elliptical profile at the forward end of stator 224 and a circular profile at the rearward end of the stator. The diameter of any one passage in any one row is the same as the diameter of any other passage in that row. The diameter of each passage 244 is larger than the diameter of each passage 246, the diameter of each passage 246 is larger than the diameter of each passage 248. That is, the diameter of the passages progressively decrease from a forward surface of stator 228 towards a rearward surface of the stator. The lines of rotation of blades 240 and the lines of rotation of passages 244, 246 and 248 are arranged so that as the blades spin, the lines are parallel, thereby creating rapid pressure changes within the passages. The centrifugal force created by the revolving blades 240 impart velocity to the fluid leaving primary stage 221, thereby pumping fluid from the primary stage through the secondary stage and through discharge duct 232. Rotor 226, stator 228, inlet duct 230 and discharge duct 232 are composed of a metal, preferably stainless steel. Mixing head 220 is interconnected to form a pipeline mixer in the manner hereinbefore described in connection with mixing head 22.

Since certain changes may be made in the foregoing disclosure, without departing from the scope of the invention herein, it is intended that all matter shown in the accompanying drawings and described in the foregoing specification be interpreted in an illustrative and not in a limiting sense.

What is claimed is:

1. A sanitary pipeline mixer comprising:
   a. a mixing head including a turbine housing having an inlet port, an internal mixing chamber and an outlet port, rotor means and stator means disposed within said turbine housing for directing a fluid through said inlet port, said mixing chamber and through said outlet port; and
   b. a seal assembly including a seal housing, a double flushed mechanical seal disposed within said seal housing;
   c. said turbine housing provided with a flange about said mixing chamber, said seal housing provided with a flange, said turbine housing flange configured to matingly engage said seal housing flange and to form a substnatially frusto-conical male head therewith.
   d. clamp means having a frusto-conical female socket configured to engage said frusto-conical male head for clamping together said turbine housing and said seal housing, said double flushed mechanical seal constituting a positively biased seal for sealing said mixing chamber when said turbine housing and said seal housing are connected;
   e. said stator means including first and second stators and said rotor means including first and second rotors, said first rotor and said first stator constituting a primary stage, said second rotor and said second stator constituting a secondary stage, said first rotor means and said second rotor means are rotatable about a common axis, said first stator having a cylindrical body formed with a conical socket and a plurality of arcuately disposed passages parallel to said axis of rotation, said first rotor having a plurality of blades, each of which constitutes a forwardly extending blade which is offset from the rotational axis of said first rotor and is disposed in a plane that intersects the rotational axis of said first rotor, said second stator having a cylindrical body formed with a conical socket and a plurality of arcuately disposed passages in concentric rows, said second stator passages parallel to said axis of rotation, the diameter of any one second stator passage in any one row having like diameters, said second stator passages having a decreasing diameter from an outer forward end of said conical socket to an inner rearward end of said conical socket, said second rotor having a plurality of blades, each of which constitutes a forwardly extending blade which is offset from the rotational axis of said second rotor and is disposed in a plane that intersects the rotational axis of said second rotor.

2. A sanitary pipeline mixer comprising:
 a. a mixing head including a turbine housing having an inlet port, an internal mixing chamber and an outlet port, rotor means and stator means disposed within said turbine housing for directing a fluid through said inlet port, said mixing chamber and through said outlet port;
 b. a seal assembly including a seal housing, a double flushed mechanical seal disposed within said seal housing;
 c. an inlet duct provided with a flange, said turbine housing provided with a first flange about said inlet port, said inlet duct flange configured to matingly engage said first flange and form a first frusto-conical male head therewith;
 d. said turbine housing provided with a second flange about said mixing chamber, said seal housing formed with a flange, said turbine housing flange configured to matingly engage said seal housing flange and form a second frusto-conical male head therewith;
 e. first and second clamp means, each said clamp means having a frusto-conical female socket, one of said febale socket configured to engage said first frusto-conical male head for clamping together said inlet duct and said turbine housing, the other of said female sockets configured to engage said second frusto-conical male head for clamping together said turbine housing and said seal housing, said double flushed mechanical seal constituting a positively biased seal for sealing said mixing chamber when said turbine housing and said seal housing are connected; and
 f. motor means drivingly connected to said rotor means for rotating said rotor within said stator means, said rotating rotor means pumping a fluid from said inlet duct, through said mixing chamber and through said discharge duct;
 g. said stator means includes first and second stator and wherein said rotor means includes first and second rotors, said first rotor and said first stator constituting a primary stage, said second rotor and said second stator constituting a secondary stage, said first rotor means and said second rotor means are rotatable about a common axis, said first stator having a cylindrical body formed with a conical socket and a plurality of arcuately disposed paggages parallel to said axis of rotation, said first rotor having a plurality of blades, each of which constitutes a forwardly extending blade which is offset from the rotational axis of said first rotor and is disposed in a plane that intersects the rotational axis of said first rotor, said second stator having a cylindrical body formed with a conical socket and a plurality of arcuately disposed passages in concentric rows, said second stator passage parallel to said axis of rotation, the diameter of any one second stator passage in any one row having like diameters, said second stator passages having a decreasing diameter from an outer forward end of said conical socket to an inner rearward end of said conical socket, said second rotor having a plurality of blades, each of which constitutes a forwardly extending blade which is offset from the rotational axis of said second rotor and is disposed in a plane that intersects the rotational axis of said second rotor.

3. A sanitary pipeline mixer comprising:
 a. a mixing head including a turbine housing having an inlet port, an internal mixing chamber and an outlet port, rotor means and stator means disposed within said turbine housing for directing a fluid through said inlet port, said mixing chamber and through said outlet port; and
 b. a seal assembly including a seal housing, a double flushed mechanical seal disposed within said seal housing;
 c. said stator means including first and second stators and said rotor means including first and second rotors, said first rotor and said first stator constituting a primary stage, said second rotor and said second stator constituting a secondary stage, said first rotor means and said second rotor means are rotatable about a common axis, said first stator having a cylindrical body formed with a conical socket and a plurality of arcuately disposed passages parallel to said axis of rotation, said first rotor having a plurality of blades, each of which constitutes a forwardly extending blade which is offset from the rotational axis of said first rotor and is disposed in a plane that intersects the rotational axis of said first rotor, said second stator having a cylindrical body formed with a conical socket and a plurality of arcuately disposed passages in concentric rows, said second stator passages parallel to said axis of rotation, the diameter of any one second stator passage in any one row having like diameters, said second stator passages having a decreasing diameter from an outer forward end of said conical socket to an inner rearward end of said conical socket, said second rotor having a plurality of blades, each of which constitutes a forwardly extending blade which is offset from the rotational axis of said second rotor and is disposed in a plane that intersects the rotational axis of said second rotor.

4. The sanitary pipeline mixer as claimed in claim 3 wherein said double flushed mechanical seal includes a pair of external O-rings, each of said end plates provided with a shoulder on an outer face thereof that is adapted to receive said external O-rings, said internal O-rings forming a chamber behind said external O-rings.

* * * * *